United States Patent
Choo et al.

(10) Patent No.: US 7,607,971 B2
(45) Date of Patent: Oct. 27, 2009

(54) METHOD FOR FABRICATING LIQUID CRYSTAL DISPLAY PANELS

(75) Inventors: Hun-Jun Choo, Gyeongsangbuk-Do (KR); Sang-Sun Shin, Gyeongsangbuk-Do (KR); Jong-Go Lim, Gyeongsangbuk-Do (KR); Ho-Kyun Kim, Inchon (KR); Sang-Chul Lee, Busan (KR)

(73) Assignee: LG Display Co., Ltd., Seoul (KR)

( * ) Notice: Subject to any disclaimer, the term of this patent is extended or adjusted under 35 U.S.C. 154(b) by 986 days.

(21) Appl. No.: 11/008,160

(22) Filed: Dec. 10, 2004

(65) Prior Publication Data

US 2005/0127834 A1    Jun. 16, 2005

(30) Foreign Application Priority Data

Dec. 16, 2003    (KR) .................. 10-2003-0092132

(51) Int. Cl.
    *B24B 1/00*    (2006.01)

(52) U.S. Cl. ..................... 451/44; 349/187; 451/54

(58) Field of Classification Search ............... 349/117, 349/156, 187; 362/561; 445/23; 451/41, 451/44, 57, 54
See application file for complete search history.

(56) References Cited

U.S. PATENT DOCUMENTS

| | | | | |
|---|---|---|---|---|
| 6,306,015 B1 * | 10/2001 | Bushell | ................ | 451/44 |
| 6,325,704 B1 * | 12/2001 | Brown et al. | .............. | 451/44 |
| 6,565,421 B1 * | 5/2003 | Choo | ................ | 451/41 |
| 6,850,088 B2 * | 2/2005 | Uh et al. | .............. | 324/770 |
| 7,329,169 B2 * | 2/2008 | Uh et al. | .............. | 451/10 |
| 2001/0006411 A1 * | 7/2001 | Awane et al. | .............. | 349/191 |
| 2003/0190863 A1 * | 10/2003 | Uh et al. | ................ | 451/5 |
| 2005/0090186 A1 * | 4/2005 | Uh et al. | ................ | 451/5 |

* cited by examiner

*Primary Examiner*—Timothy V Eley
(74) *Attorney, Agent, or Firm*—McKenna Long & Aldridge LLP

(57) ABSTRACT

A cut section checking/aligning unit simultaneously checks cut sections of unit liquid crystal display panels that are separated from within first and second base substrates and aligns the unit liquid crystal display panels to a reference position. A grinding unit grinds edges of the unit liquid crystal display panels. The cut section checking/aligning unit and the grinding unit are integrated within a grinding device.

5 Claims, 6 Drawing Sheets

METHOD FOR FABRICATING LIQUID CRYSTAL DISPLAY PANELS

This application claims the benefit of Korean Patent Application No. P2003-92132, filed on Dec. 16, 2003, which is hereby incorporated by reference for all purposes as if fully set forth herein.

BACKGROUND OF THE INVENTION

1. Field of the Invention

The present invention relates to an apparatus for fabricating liquid crystal display (LCD) panels and to a method of fabricating LCD panels. More particularly, the present invention relates to an apparatus, used for fabricating LCD panels, that has a simplified structure and reduces the length of a production line, in addition to, a method of fabricating LCD panels.

2. Discussion of the Related Art

Generally, LCD devices display images by controlling light transmittance characteristics of an array of pixels in accordance with data signals, derived from image information, applied to the pixels. A typical LCD device includes a unit LCD panel having a plurality of pixels arranged in a matrix pattern, and gate and data driving units for driving the pixels.

The LCD panel typically includes a color filter substrate and a thin film transistor (TFT) array substrate attached to each other and separated from each other by a cell-gap. A liquid crystal layer is also formed within the cell-gap, between the color filter and TFT array substrates.

The color filter substrate supports a common electrode while the TFT array substrate typically supports a plurality of data lines transmitting data signals from the data driving unit to the pixels, a plurality of gate lines transmitting scan signals from the gate driving unit to the pixels, and a plurality of TFTs arranged within each of the pixels. The gate and data lines are generally arranged orthogonally to each other and, where they cross, define the pixels. In response to scan signals sequentially supplied by the gate driver, the TFTs switch data signals transmitted by the data driving unit from the data lines to corresponding pixel electrodes.

Thus, when data and reference signals are applied to the pixel and common electrodes, respectively, an electric field is generated within the liquid crystal layer. Due to anisotropic dielectric properties of molecules within the liquid crystal layer, the generated electric field rotates liquid crystal molecules between the common electrodes and the pixel electrodes. When the liquid crystal molecules rotate, the light transmittance characteristics of the pixel change. Thus, by controlling the magnitude of the generated electric field with the data and reference signals, the plurality of pixels may be controlled to display images.

FIG. 1 illustrates a plan view of a related art LCD panel.

Referring to FIG. 1, the related art LCD panel 100 includes an image display unit 113 having a plurality of pixels arranged in a matrix pattern, a gate pad unit 114 connected to gate lines of the image display unit 113, and a data pad unit 115 connected to data lines of the image display unit 113.

The image display unit 113 of the LCD panel 100 includes a TFT array substrate 101 and a color filter array substrate 102. The TFT array substrate 101 supports gate and data lines that cross each other to define pixels, pixel electrodes formed within the pixels, and TFTs arranged at crossings of the gate and data lines and connected to corresponding pixel electrodes for driving the pixel electrodes. A protecting film (not shown) is formed over the entire surface of the TFT array substrate 101 to protect the electrodes and the TFTs.

The gate pad unit 114 and the data pad unit 115 are formed at edges of the TFT array substrate 101 that are not overlapped by the color filter substrate 102. Accordingly, the gate pad unit 114 transmits scan signals, supplied by a gate driving unit (not shown), to the gate lines and the data pad unit 115 transmits image information, supplied by a data driving unit (not shown), to the data lines.

The color filter substrate 102 supports a black matrix defining cell regions, a plurality of color filters separated by the cell regions, and common transparent electrodes opposing the pixel electrodes.

The thin film transistor array substrate 101 and the color filter substrate 102 are joined to, and spaced apart from, each other via a seal pattern structure 116 formed at the periphery of the image display unit 113 to define a cell-gap. Uniformity of the cell gap is maintained by a spacer structure (not shown) and a liquid crystal layer is formed within the cell gap.

Recently, a process has been developed that facilitates the simultaneous fabrication of a plurality of the LCD panels (such as those shown in FIG. 1) and thereby increases the production yield of such LCD panels. Typically, a plurality of TFT array substrates are formed on a first base substrate, larger than each individual TFT array substrate, a plurality of color filter substrates are formed on a second base substrate, larger than each individual color filter substrate; the first and second base substrates are joined to each other via the sealant material; and the joined first and second base substrates are cut and processed to form individual (i.e., unit) LCD panels.

FIG. 2 schematically illustrates a related art apparatus used to fabricate unit LCD panels.

Referring to FIG. 2, the related art apparatus typically includes an attaching unit 210 for joining the first and second base substrates; a cutting unit 220 for cutting the joined first and second base substrates to form separated unit LCD panels; a first loading unit 230 for loading the unit LCD panels; a cut section checking unit 240 for checking cut sections of the loaded unit LCD panels; a first unloading unit 250 for unloading the checked unit LCD panels; a robot 260 for transferring the unloaded unit LCD panels from the first unloading unit 250; an aligning unit 270 for aligning the transferred unit LCD panels; a grinding unit 280 for grinding edges of the aligned unit LCD panels; and a second unloading unit 290 for unloading the ground unit LCD panels.

As shown above, the cut section checking unit 240 and the grinding unit 280 are physically separate units. Therefore, each unit requires its own loading and unloading units to ensure that unit LCD panels are properly loaded into, and removed from, the cut section checking and grinding units 240 and 280. Because each of the cut section checking and grinding units 240 and 280 require their own loading/unloading units, they also require their own loading/unloading and transferring procedures.

Specifically, the checking procedure employed to check the cut sections of the unit LCD panels involves operating the first loading unit 230 to load the separated unit LCD panels into the cut section checking unit 240, operating the cut section checking unit 240 to check the cut sections of the loaded unit LCD panels, and operating the first unloading unit 250 to unload the checked unit LCD panels. Similarly, the grinding procedure employed to grind the edges of the checked unit LCD panels involves operating the robot 260 to transfer the checked unit LCD panels into the aligning unit 270, operating the aligning unit 270 to align the loaded unit LCD panels, operating the grinding unit 280 to grind the edges of the aligned unit LCD panels, and operating the second unloading unit 290 to unload the ground unit LCD panels. Further, the unit LCD panels must be transferred between the first loading unit 230 and the cut section checking unit 240, between the cut section checking unit 240 and the first unloading unit 250, between the aligning unit 270 and the grinding unit 280, and between the grinding unit 280 and the second unloading unit 290.

As is evident, the time required to complete fabrication of a unit LCD panel, as well as the amount of space required by the related art apparatus and using the related art apparatus described above, can be excessive. Further, use of the related art apparatus described above can increase the cost of fabricating the unit LCD panels, increase the cost of maintaining the fabrication equipment, and decrease the efficiency with which the unit LCD panels are fabricated.

SUMMARY OF THE INVENTION

Accordingly, the present invention is directed to an apparatus for fabricating liquid crystal display panels and a method of fabricating LCD panels that substantially obviates one or more of the problems due to limitations and disadvantages of the related art.

An advantage of the present invention provides an apparatus for fabricating LCD panels, wherein the apparatus has a simplified structure.

Another advantage of the present invention provides an apparatus for fabricating LCD panels, wherein the apparatus occupies a reduced amount of space.

Still another advantage of the present invention provides an apparatus capable of fabricating LCD panels in a reduced amount of time.

Yet another advantage of the present invention provides an apparatus for fabricating LCD panels, wherein the apparatus includes an integrated cut section checking unit, for checking the cut sections of LCD panels, and grinding unit, for grinding the edges of checked LCD panels.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an apparatus for fabricating LCD panels, may, for example, include an attaching unit for attaching first and second base substrates; a cutting unit for cutting the attached first and second base substrates to form separate unit liquid crystal display panels; a checking/aligning unit for simultaneously checking cut sections of the unit liquid crystal display panels transferred from the cutting unit and for aligning the unit liquid crystal display panels to a predetermined reference position; a grinding unit for grinding edges of the aligned unit liquid crystal display panels; and an unloading unit for unloading the ground unit liquid crystal display panels.

According to principles of the present invention, a method for fabricating unit LCD panels may, for example, include attaching first and second base substrates; cutting the attached first and second base substrates to form separate unit liquid crystal display panels; simultaneously checking cut sections of the unit liquid crystal display panels and aligning the unit liquid crystal display panels to a predetermined reference position; grinding edges of the aligned unit liquid crystal display panels; and unloading the ground unit liquid crystal display panels.

According to principles of the present invention, a method for fabricating unit LCD panels may, for example, include attaching first and second base substrates; separating a plurality of unit liquid crystal display panels from within the attached first and second base substrates, the plurality of unit liquid crystal display panels having a first pair and a second pair of opposing sides; loading the unit liquid crystal display panels onto a table and between first to fourth checking bars; driving the first to fourth checking bars to simultaneously check edges of the first and second pairs of opposing sides of the unit liquid crystal display panels and to align the unit liquid crystal display panels to a predetermined reference position; grinding edges of the aligned unit liquid crystal display panels; and unloading the ground unit liquid crystal display panels.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
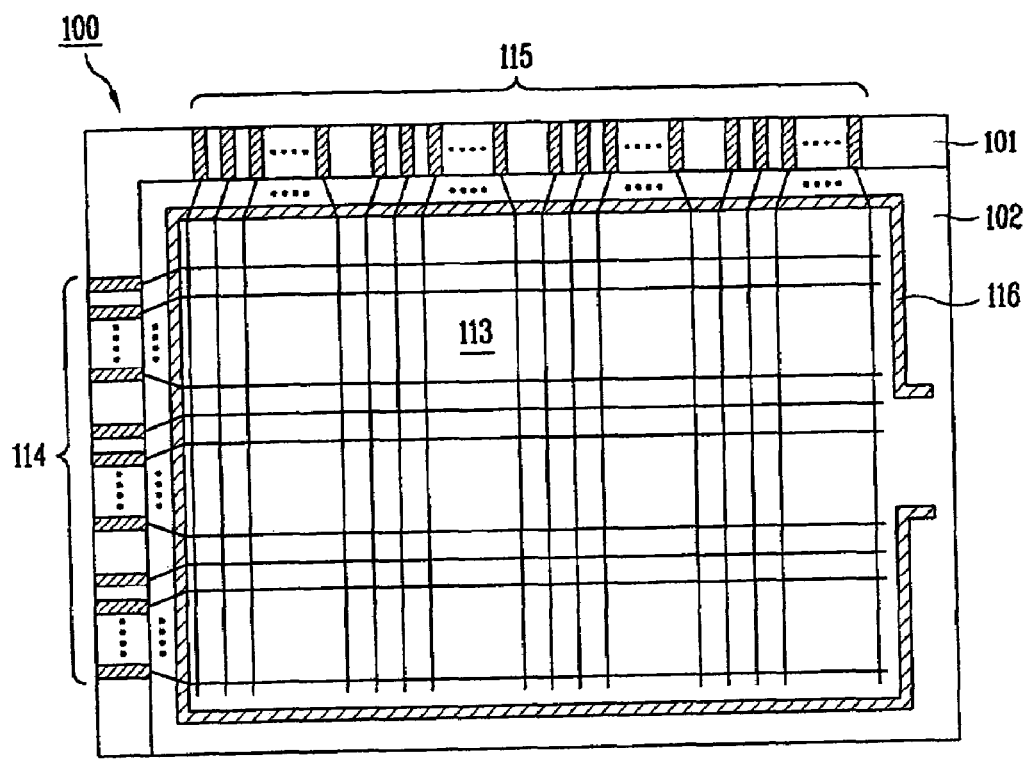
FIG. 1 illustrates a plan view of a related art unit LCD panel.
Figure 2:
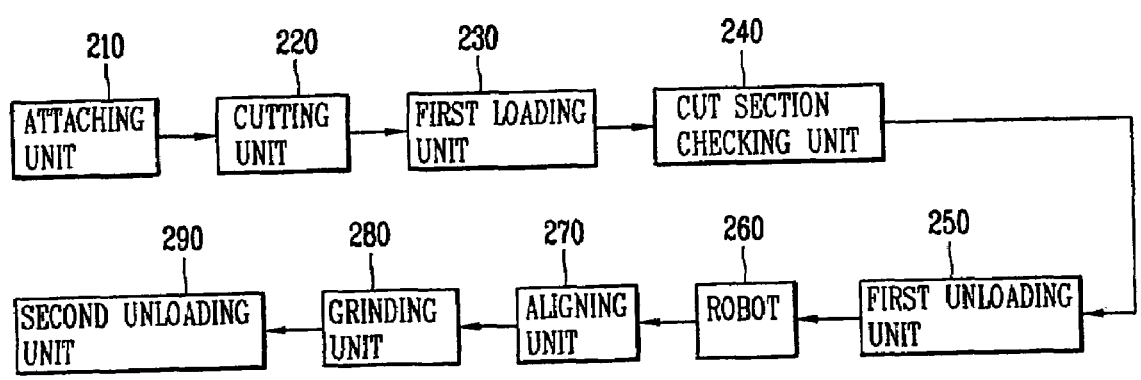
FIG. 2 schematically illustrates a related art apparatus used to fabricate unit LCD panels.
Figure 3:
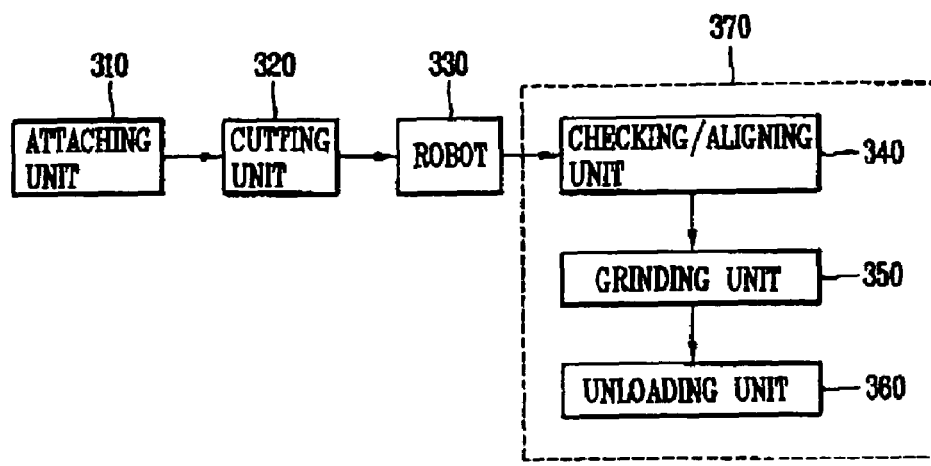
FIG. 3 schematically illustrates an apparatus used to fabricate unit LCD panels in accordance with principles of the present invention.

FIG. 3 schematically illustrates an apparatus used to fabricate unit liquid crystal display (LCD) panels in accordance with principles of the present invention.

Referring to FIG. 3, an apparatus for fabricating unit liquid crystal display (LCD) panels may, for example, include an attaching unit 310 for attaching a first base substrate, on which a plurality of thin film transistor (TFT) array substrates have been formed, and a second base substrate, on which a plurality of color filter substrates have been formed; a cutting unit 320 for cutting the attached first and second base substrates, thereby forming separate unit LCD panels; a checking/aligning unit 340 for checking cut sections of the unit LCD panels while aligning the unit LCD panels to a predetermined reference position within the checking/aligning unit 340; a robot 330 for transferring the unit LCD panels from the cutting unit 320 to the checking/aligning unit 340; a grinding unit 350 for grinding the edges of the aligned unit LCD panels; and an unloading unit 360 for unloading the ground unit LCD panels.

In one aspect of the present invention, the checking/aligning unit 340, the grinding unit 350, and the unloading unit 360 may be integrally provided within a single grinding device 370. In another aspect of the present invention, when the unit LCD panel is aligned to the predetermined reference position, the grinding unit 350 may effectively grind edges of the unit LCD panel.

In one aspect of the present invention, the first base substrate may include a plurality of TFT array substrates and the second base substrate may include a plurality of color filter substrates. Accordingly, the attaching unit 310 may, for example, attach the first base substrate to the second base substrate such that the TFT array and color filter substrates oppose, and are aligned with respect to, each other. In one aspect of the present invention, the first and second base substrates may be attached via seal patterns to define a predetermined cell gap. Moreover, a spacer may be provided to uniformly maintain the cell gap.

Figure 4:
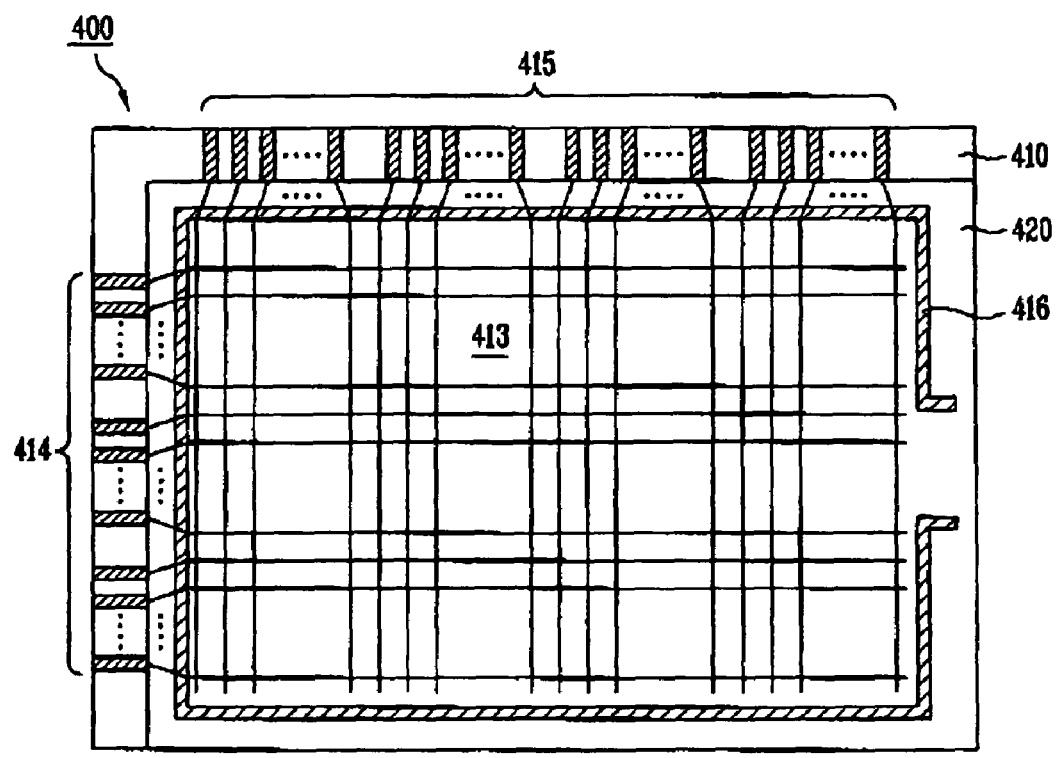
FIG. 4 illustrates an exemplary plan view of a unit LCD panel fabricated in accordance with principles of the present invention.

Referring to FIG. 4, each unit LCD panel may, for example, include an image display unit 413 having a plurality of pixels arranged in a which pattern, a gate pad unit 414 connected to gate lines of the image display unit 413, and a data pad unit 415 connected to data lines of the image display unit 413.

The image display unit 413 of the unit LCD panel 400 may include a TFT array substrate 410 and a color filter array substrate 420. The TFT array substrate 410 may supports gate and data lines that cross each other to define pixels, pixel electrodes formed within the pixels, and TFTs arranged at crossings of the gate and data lines and connected to corresponding pixel electrodes for driving the pixel electrodes. A protecting film (not shown) may be formed over the entire surface of the TFT array substrate 410 to protect the electrodes and the TFTs.

The gate pad unit 414 and the data pad unit 415 may be formed at edges of the TFT array substrate 410 that are not overlapped by the color filter substrate 420. Accordingly, the gate pad unit 414 may transmit scan signals, supplied by a gate driving unit (not shown), to the gate lines and the data pad unit 415 may transmit image information, supplied by a data driving unit (not shown), to the data lines.

The color filter substrate 420 may support a black matrix defining cell regions, a plurality of color filters separated by the cell regions, and common transparent electrodes opposing the pixel electrodes.

The thin film transistor array substrate 410 and the color filter substrate 420 may be joined to, and spaced apart from, each other via a seal pattern structure 416 formed at the periphery of the image display unit 413 to define a cell-gap. Uniformity of the cell gap may be maintained by a spacer structure (not shown) and a liquid crystal layer may be provided within the cell gap according to methods such as those described in greater detail below.

Thus, when data and reference signals are applied to the pixel and common electrodes, respectively, an electric field is generated within the liquid crystal layer. Due to anisotropic dielectric properties of molecules within the liquid crystal layer, the generated electric field rotates liquid crystal molecules between the common electrodes and the pixel electrodes. When the liquid crystal molecules rotate, the light transmittance characteristics of the pixel change. Thus, by controlling the magnitude of the generated electric field with the data and reference signals, the plurality of pixels may be controlled to display images. As discussed above, the common electrodes are formed on the color filter substrate 420. Therefore, the unit LCD panel discussed above generates an electric field that is vertically oriented between the TFT array and color filter substrates 410 and 420. If, however, the common electrodes are formed on the same substrate as the pixel electrodes (i.e., the TFT array substrate 410), the electric field may be horizontally oriented between the TFT array and color filter substrates 410 and 420. In this case, the unit LCD panel is provided as an IPS mode LCD panel.

According to principles of the present invention, the aforementioned liquid crystal layer may be formed according to either a vacuum injection or a dispensing method.

In practicing the vacuum injection method, a liquid crystal injection hole may be formed in the sealant structure 416, a unit LCD panel having the liquid crystal injection hole may be introduced into a vacuum chamber. The pressure within the vacuum chamber may then reduced and the liquid crystal injection hole may be caused to contact a reservoir of liquid crystal material provided within the vacuum chamber. Subsequently, the pressure within the vacuum chamber may be increased, causing liquid crystal material within the reservoir to be injected through the liquid crystal injection hole and into the cell gap of the unit LCD panel. After the cell gap is suitably filled with liquid crystal material, the liquid crystal injection hole may be sealed to prevent liquid crystal leakage from the unit LCD panel. According to principles of the present invention, liquid crystal material may be injected into the cell gap of a unit LCD panel after edges of the unit LCD panel have been ground by the grinding unit 350. Therefore, if unit LCD panels are to be formed according to the liquid crystal injection method, the unit LCD panels may be transferred to a liquid crystal injection unit (not shown), that includes the aforementioned vacuum chamber, after being unloaded by the unloading unit 360.

In practicing the dispensing method, droplets of liquid crystal material may be directly dispensed onto either the first or second base substrates a region corresponding to the image display unit 413. After dispensing the liquid crystal material, the first and second base substrates may be attached to each other. Pressure employed in attaching the first and second base substrates, may be used to evenly spread and distribute the dispensed liquid crystal material between the first and second base substrates across the image display unit 413 to form the liquid crystal layer. The dispensing method does not require liquid crystal material to be injected. Therefore, the sealant structure of a unit LCD panel fabricated using the dispensing method may be provided as a closed structure, not including the liquid crystal injection hole. According to principles of the present invention, liquid crystal material may be dispensed onto one of the first and second base substrates prior to loading the first and second base substrates into the attaching unit 310. Therefore, if unit LCD panels are to be formed according to the dispensing method, at least one of the first and second base substrates may be transferred to a liquid crystal dispensing unit (not shown) before the first and second substrates are attached in the attaching unit 310.

According to principles of the present invention, the cutting unit 320 may form scribing lines on the surfaces of the first and second base substrates, attached by the attaching unit 310. In one aspect of the present invention, the first and second base substrates may include a material such as glass. In another aspect of the present invention, the scribing lines may be formed using a scribing wheel having a hardness that is greater than a hardness of the first and second base substrates. In still another aspect of the present invention, the scribing wheel may propagate cracks through the substrates and along the scribing lines to form separate unit LCD panels formed on the first and second base substrates.

According to principles of the present invention, the robot 330 may transfer the separated unit LCD panels from the cutting unit 320 to the checking/aligning unit 340. In one aspect of the present invention, a conveyor system may be used in conjunction with, or in the place of, the robot 330 to transfer the separated unit LCD panels from the cutting unit 320 to the checking/aligning unit 340.

According to principles of the present invention, the checking/aligning unit 340 may check cut sections of the transferred unit LCD panels and may align the unit LCD panels to the predetermined reference position. In one aspect of the present invention, the checking and aligning may be performed simultaneously. If, for example, after checking the cut sections of the transferred unit LCD panels, it is determined that imperfections (e.g., burrs) exist on the cut sections of the transferred unit LCD panels, those unit LCD panels may be removed from the checking/aligning unit 340 and be either re-cut or destroyed.

Figure 5:
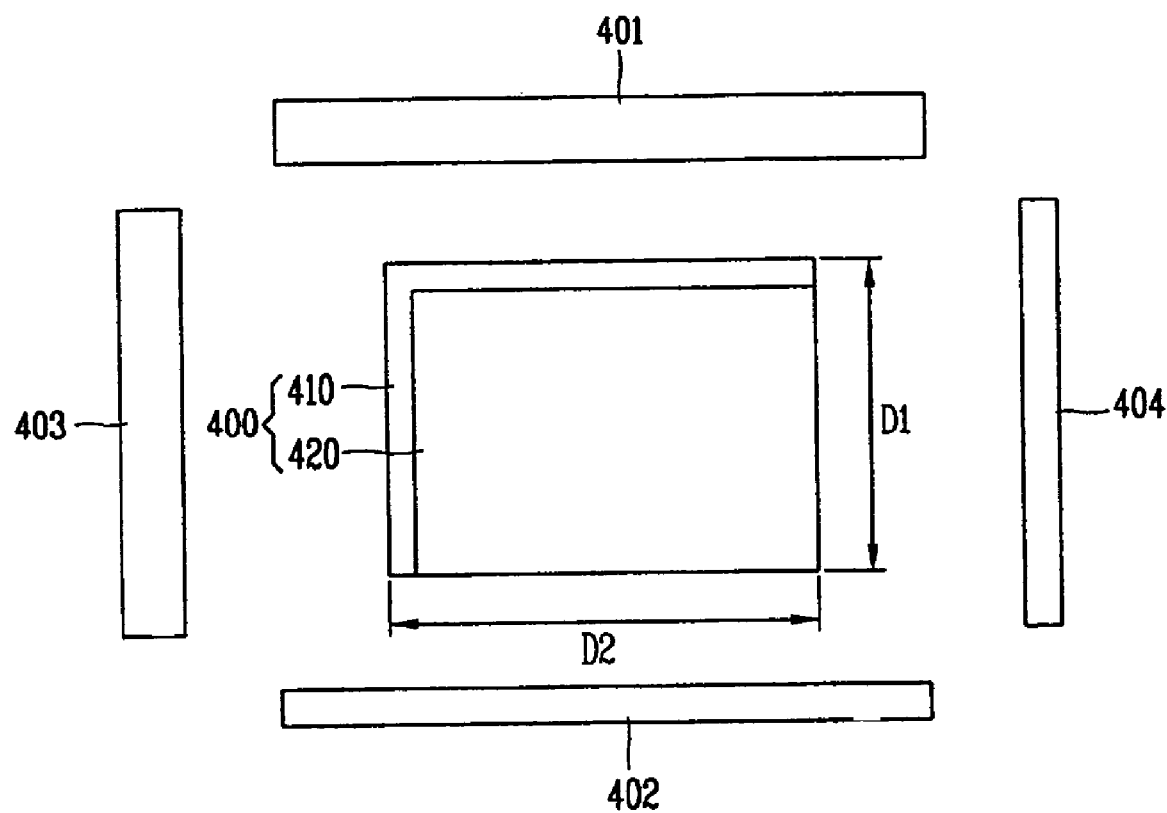
FIG. 5 illustrates the checking/aligning unit shown in FIG. 3 in accordance with one embodiment of the present invention.

FIG. 5 illustrates the checking/aligning unit 340 shown in FIG. 3 in accordance with one embodiment of the present invention.

Referring to FIG. 5, the checking/aligning unit 340 may, for example, include first and second checking bars 401 and 402, respectively, and third and fourth checking bars 403 and 404, respectively. In one aspect of the present invention, the first and second checking bars 401 and 402 may check the cut sections of a first pair of opposing sides of a unit LCD panel 400 (e.g., the side on which the data pad unit 415 is formed and the opposing side). In another aspect of the present invention, the first and second checking bars 401 and 402 may, if necessary, reposition and align the unit LCD panel 400 along a direction parallel to a second pair of opposing sides of the unit LCD panel 400 (e.g., the side on which the gate pad unit 414 is formed and the opposing side). In still another aspect of the present invention, the first and second checking bars 401 and 402 may perform the aforementioned checking and aligning simultaneously. In one aspect of the present invention, the third and fourth checking bars 403 and 404 may check the cut sections of the second pair of opposing sides of the unit LCD panel 400. In another aspect of the present invention, the third and fourth checking bars 403 and 404 may, if necessary, reposition and align the unit LCD panel 400 along a direction parallel to the first pair of opposing sides. In still another aspect of the present invention, the third and fourth checking bars 403 and 404 may perform the aforementioned checking and aligning simultaneously. In yet another aspect of the present invention, the length of the first pair of opposing sides of the unit LCD panel 400 may be greater than, equal to, or less than the length of the second pair of the unit LCD panel 400.

The first and second checking bars 401 and 402 may be simultaneously driven by a motor. Thus, upon driving the first and second checking bars 401 and 402, the existence of imperfections (e.g., burrs) on the first pair of opposing sides of the unit LCD panel 400 may be determined while aligning the unit LCD panel 400 to a predetermined reference position with respect to a direction parallel to the second pair of opposing sides of the unit LCD panel 400. Further, the third and fourth checking bars 403 and 404 may be simultaneously driven by a motor. Thus, upon driving the third and fourth checking bars 403 and 404, the existence of imperfections (e.g., burrs) on the second pair of opposing sides of the unit LCD panel 400 may be determined while aligning the unit LCD panel 400 to a predetermined reference position with respect to a direction parallel to the first pair of opposing sides of the unit LCD panel 400.

It will be readily appreciated that the unit LCD panels may be fabricated, and therefore cut, in numerous sizes and dimensions. Therefore, the length of the first and second checking bars 401 and 402 may be greater than or substantially equal to a length of the first sides of any unit LCD panel 400 to be fabricated using the apparatus illustrated in FIG. 3. Similarly, the length of the third and fourth checking bars 403 and 404 may be greater than or substantially equal to a length of the second sides of any unit LCD panel 400 to be fabricated using the apparatus illustrated in FIG. 3. Accordingly, unit LCD panels of substantially any size and any dimension may be checked and aligned using the first to fourth checking bars 401 to 404 of the present invention.

In one aspect of the present invention, the first to fourth checking bars 401 to 404 may be provided with gauges to measure lengths of the first and second pairs of opposing sides of the unit LCD panel 400. For example, the gauges may measure a first length D1 between the first pair of opposing sides of the unit LCD panel 400 as well as a second length D2 between the second pair of opposing sides of the unit LCD panel 400.

As previously mentioned, the unit LCD panel 400 includes a TFT array substrate 410 and a color filter array substrate 420. As shown in FIG. 5, the lengths of the first and second pairs of opposing sides of the TFT array substrate 410 are greater than the lengths of the first and second pairs of opposing sides of the color filter substrate 420. Accordingly, one of the pair of first sides of the unit LCD panel 400 may comprise only the TFT array substrate 410 while the other of the pair of first sides of the unit LCD panel 400 may comprise both the TFT array and color filter substrates 410 and 420. Further, one of the pair of second sides of the unit LCD panel 400 may comprise only the TFT array substrate 410 while the other of the pair of the second sides of the unit LCD panel 400 may comprise both the TFT array and color filter substrates 410 and 420. Accordingly, one of each of the pairs of first and second sides of the unit LCD panel shown in FIG. 5 may, for example, define a stepped end topography. Such first and second sides will herein be referred to as stepped first and second sides. In one aspect of the present invention, the gate pad and data pad units 414 and 415, respectively, may be formed along the stepped first and second sides, respectively, of the unit LCD panel 400. In another aspect of the present invention, the first and third checking bars 401 and 403 may include a stepped topography that substantially complements the topography of the stepped first and second sides of the unit LCD panel 400. Accordingly, the first and third checking bars 401 and 403 may substantially engage the stepped topography of the stepped first and second sides of the unit LCD panel 400.

Figure 6A:
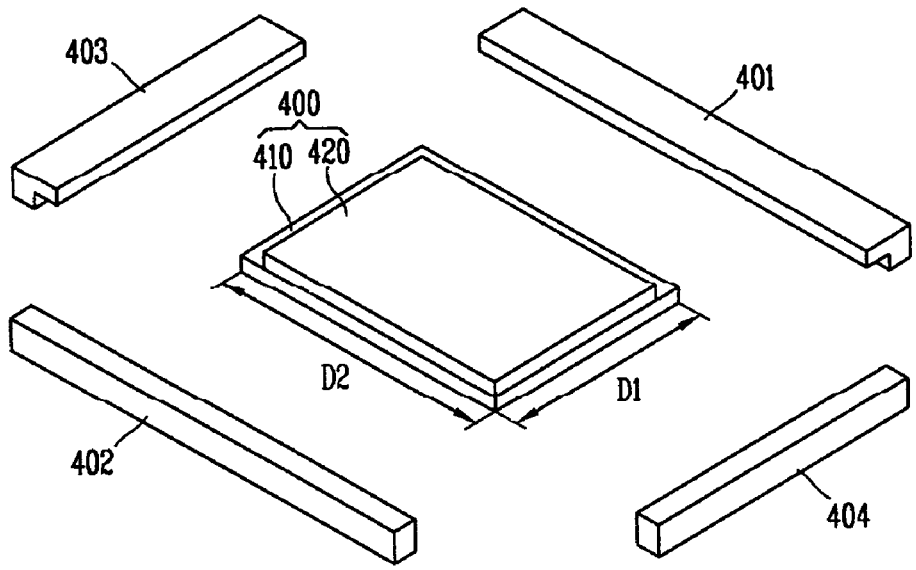
FIGS. 6A to 6C illustrate an exemplary method of checking cut sections of unit LCD panels and aligning unit LCD panels to a predetermined reference position using the checking/aligning unit shown in FIG. 4.
Figure 6B:
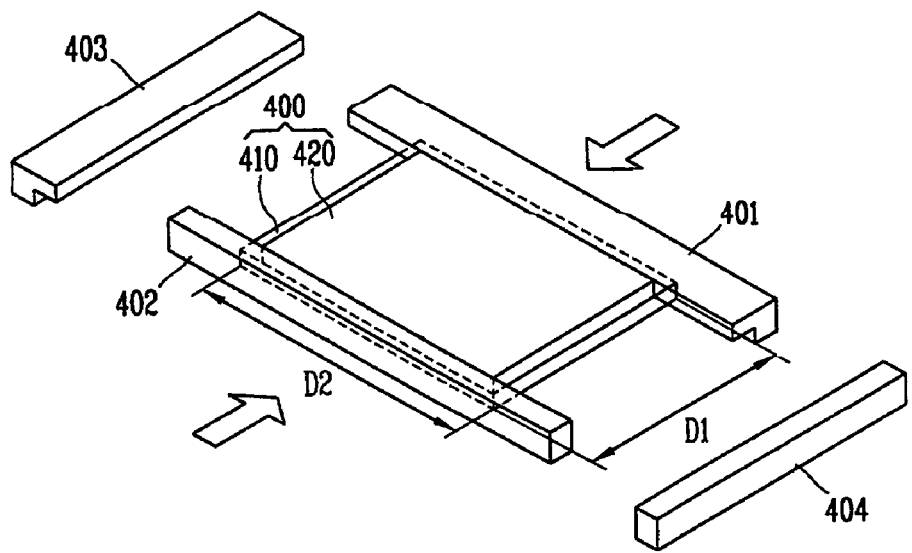
Figure 6C:
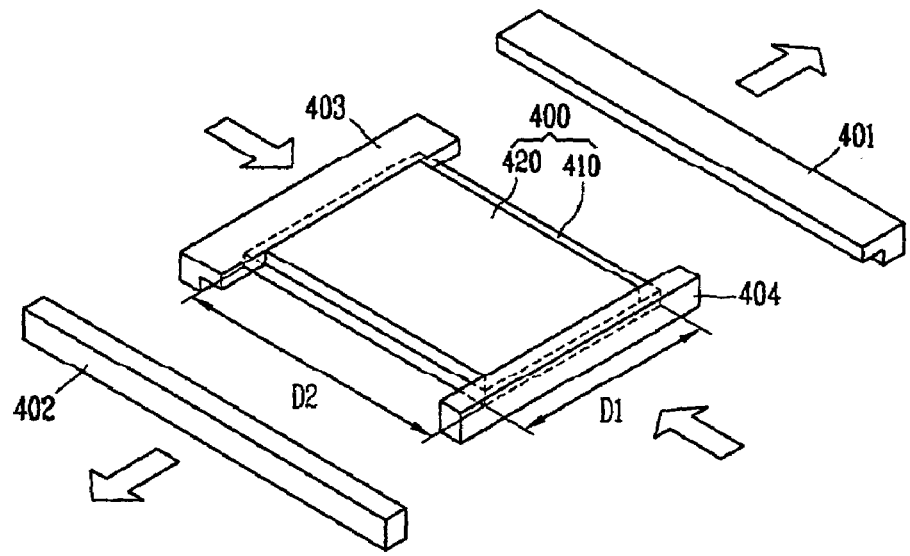

FIGS. 6A to 6C illustrate an exemplary method of checking cut sections of a unit LCD panel and aligning the LCD panel to a predetermined reference position using the checking/aligning unit shown in FIG. 4.

Referring to FIG. 6A, the aforementioned unit LCD panel 400 may be loaded onto a table (not shown). Accordingly, the aforementioned first to fourth checking bars 401 to 404 may be moved with respect to the table, wherein the first and third checking bars 401 and 403, respectively, include the stepped topography that complements the topography of stepped first and second sides of the unit LCD panel 400.

Referring to FIG. 6B, the first and second checking bars 401 and 402 may be simultaneously driven by a motor (not shown) to check for the existence of imperfections (e.g., burrs) on the cut sections of the first and second a first pair of opposing sides of the unit LCD panel 400. In one aspect of the present invention, the first and second checking bars 401 and 402 may also reposition and align the unit LCD panel 400 along a direction parallel to the second pair of opposing sides. In another aspect of the present invention, the first and second checking bars 401 and 402 may perform the aforementioned checking and aligning simultaneously.

Referring to FIG. 6C, the third and fourth checking bars 403 and 404 may be simultaneously driven by a motor (not shown) to check for the existence of imperfections (e.g., burrs) on the cut sections of the first and second a second pair of opposing sides of the unit LCD panel 400. In one aspect of the present invention, the third and fourth checking bars 403 and 404 may also reposition and align the unit LCD panel 400 along a direction parallel to the first pair of opposing sides. In another aspect of the present invention, the third and fourth checking bars 403 and 404 may perform the aforementioned checking and aligning simultaneously.

As mentioned above, the first to fourth checking bars 401 to 404 may be provided with gauges to measure lengths of the first and second pairs of opposing sides of the unit LCD panel 400. For example, the gauges may measure a first length D1 between the first pair of opposing sides of the unit LCD panel 400 as well as a second length D2 between the second pair of opposing sides of the unit LCD panel 400.

Thus, as shown in FIGS. 6A to 6C, pairs of the first to fourth checking bars 401 to 404 may be simultaneously driven. Upon variously driving the pairs of the first to fourth checking bars 401 to 404, the existence of imperfections (e.g., burrs) on the first and second pairs of opposing sides of the unit LCD panel 400 may be determined while aligning the unit LCD panel 400 to a predetermined reference position along directions parallel to the first and second pairs of opposing sides of the unit LCD panel 400.

Figure 7:
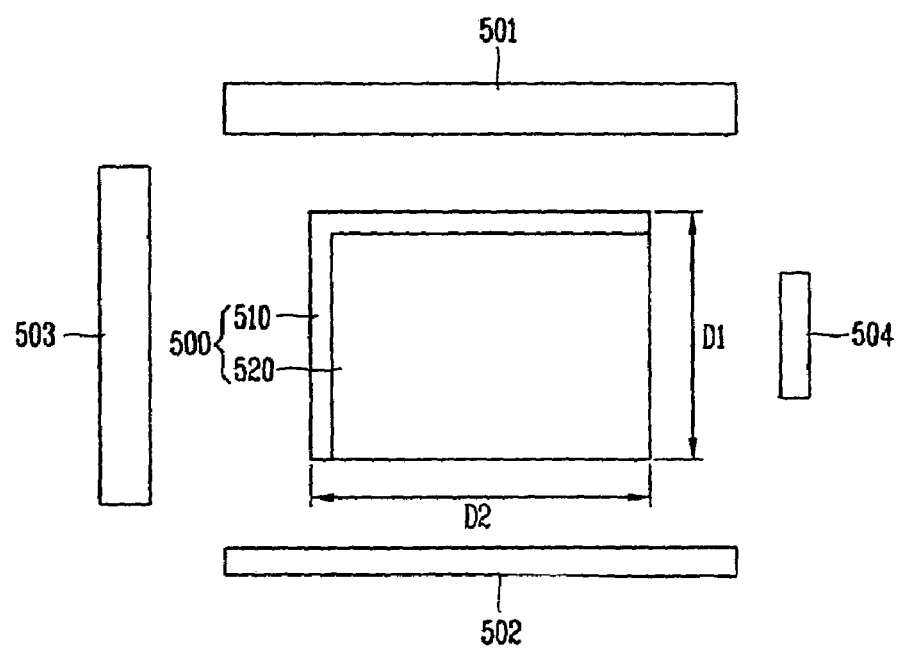
FIG. 7 illustrates the checking/aligning unit shown in FIG. 3 in accordance with another embodiment of the present invention.

FIG. 7 illustrates the checking/aligning unit 340 shown in FIG. 3 in accordance with another embodiment of the present invention.

Referring to FIG. 7, the checking/aligning unit 340 may, for example, include first and second checking bars 501 and 502, respectively, and third and fourth checking bars 503 and 504, respectively. In one aspect of the present invention, the unit LCD panel 500 may be similar to unit LCD panel 400 illustrated in FIGS. 4 to 6C. Accordingly, the first pair of opposing sides of the unit LCD panel 500 may correspond to a side on which a data pad unit is formed and an opposing side. In another aspect of the present invention, the first and second checking bars 501 and 502 may, if necessary, reposition and align the unit LCD panel 500 along a direction parallel to a second pair of opposing sides of the unit LCD panel 500 (e.g., a side on which a gate pad unit is formed and an opposing side). In still another aspect of the present invention, the first and second checking bars 501 and 502 may perform the aforementioned checking and aligning simultaneously. In one aspect of the present invention, the third and fourth checking bars 503 and 504 may check cut sections of the second pair of opposing sides of the unit LCD panel 500. In another aspect of the present invention, the third and fourth checking bars 503 and 504 may, if necessary, reposition and align the unit LCD panel 500 along a direction parallel to the first pair of opposing sides. In still another aspect of the present invention, the third and fourth checking bars 503 and 504 may perform the aforementioned checking and aligning simultaneously. In yet another aspect of the present invention, the length of the first pair of opposing sides of the unit LCD panel 500 may be greater than, equal to, or less than the length of the second pair of the unit LCD panel 500.

It will be readily appreciated that the unit LCD panels may be fabricated, and therefore cut, in numerous sizes and dimensions. Thus, and in accordance with the principles of the present invention, the length of the first and second checking bars 501 and 502 may be greater than or substantially equal to a length of the first sides of any unit LCD panel 500 to be fabricated using the apparatus illustrated in FIG. 3. Similarly, the length of the third checking bar 403 may be greater than or substantially equal to a length of the second sides of any unit LCD panel 500 to be fabricated using the apparatus illustrated in FIG. 3. Moreover, the length of the fourth checking bar 504 may be substantially equal to or less than a length of a second side of the smallest unit LCD panel 500 to be fabricated using the apparatus illustrated in FIG. 3.

In one aspect of the present invention, the first to fourth checking bars 501 to 504 may be provided with gauges to measure lengths of the first and second pairs of opposing sides of the unit LCD panel 500. For example, the gauges may measure a first length D1 between the first pair of opposing sides of the unit LCD panel 500 as well as a second length D2 between the second pair of opposing sides of the unit LCD panel 500.

As previously mentioned, the unit LCD panel 500 is similar to the unit LCD panel 400 illustrated in FIGS. 4 to 6C and, therefore, includes a TFT array substrate 510 and a color filter array substrate 520. As shown in FIG. 7, the lengths of the first and second pairs of opposing sides of the TFT array substrate 510 may be greater than the lengths of the first and second pairs of opposing sides of the color filter substrate 520. Accordingly, one of the pair of first sides of the unit LCD panel 500 may comprise only the TFT array substrate 510 while the other of the pair of first sides of the unit LCD panel 500 may comprise both the TFT array and color filter substrates 510 and 520. Further, one of the pair of second sides of the unit LCD panel 500 may comprise only the TFT array substrate 510 while the other of the pair of the second sides of the unit LCD panel 500 may comprise both the TFT array and color filter substrates 510 and 520. Accordingly, one of each of the pairs of first and second sides of the unit LCD panel shown in FIG. 5 may, for example, define a stepped end topography. Such first and second sides will herein be referred to as stepped first and second sides. In one aspect of the present invention, the gate pad and data pad units may be formed along the stepped first and second sides, respectively, of the unit LCD panel 500. In another aspect of the present invention, the first and third checking bars 501 and 503 may include a stepped topography that substantially complements the topography of the stepped first and second sides of the unit LCD panel 500. Accordingly, the first and third checking bars 501 and 503 may substantially engage the stepped topography of the stepped first and second sides of the unit LCD panel 400.

Figure 8A:
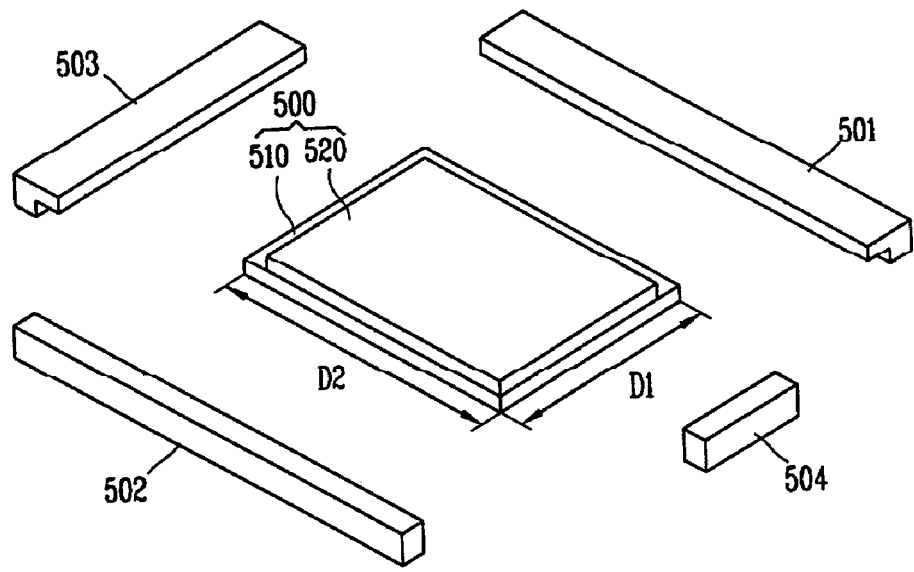
FIGS. 8A and 8B illustrate an exemplary method of checking cut sections of unit LCD panels and aligning LCD panels to a predetermined reference position using the checking/aligning unit shown in FIG. 7.
Figure 8B:
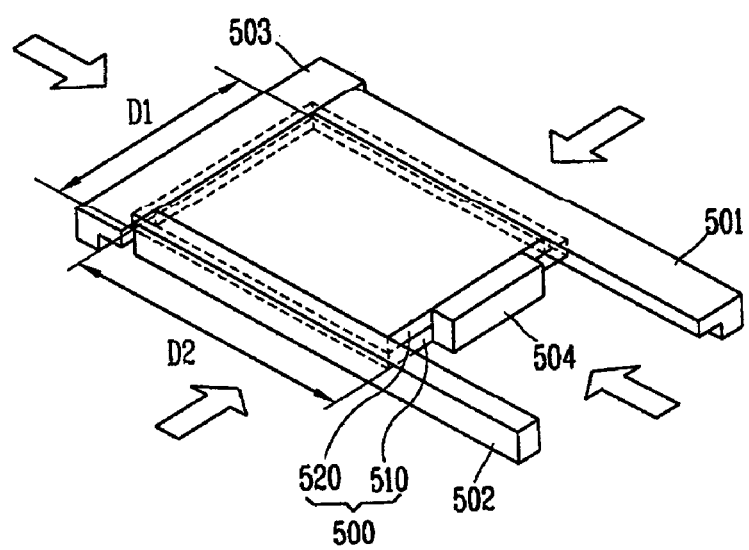

FIGS. 8A and 8B illustrate an exemplary method of checking cut sections of a unit LCD panel and aligning the LCD panel to a predetermined reference position using the checking/aligning unit shown in FIG. 7.

Referring to FIG. 8A, the aforementioned unit LCD panel 500 may be loaded onto a table (not shown). Accordingly, the aforementioned first to fourth checking bars 501 to 504 may be moved with respect to the table, wherein the first and third checking bars 501 and 503, respectively, include the stepped topography that complements the topography of stepped first and second sides of the unit LCD panel 500.

Referring to FIG. 8B, the first to fourth checking bars 501 to 504 may be simultaneously driven by a motor (not shown) to check for the existence of imperfections (e.g., burrs) on the cut sections of the first and second pairs of opposing sides of the unit LCD panel 500. In one aspect of the present invention, the first to fourth checking bars 501 to 504 may also reposition and align the unit LCD panel 500 along directions parallel to the first and second pairs of opposing sides. In another aspect of the present invention, the first to fourth checking bars 501 to 504 may perform the aforementioned checking and aligning simultaneously.

As mentioned above, the first to fourth checking bars 501 to 504 may be provided with gauges to measure lengths of the first and second pairs of opposing sides of the unit LCD panel 500. For example, the gauges may measure a first length D1 between the first pair of opposing sides of the unit LCD panel 500 as well as a second length D2 between the second pair of opposing sides of the unit LCD panel 500.

Thus, as shown in FIGS. 8A and 8B, the first to fourth checking bars 501 to 504 may be simultaneously driven. Upon driving the first to fourth checking bars 501 to 504, the existence of imperfections (e.g., burrs) on the first and second pairs of opposing sides of the unit LCD panel 500 may be determined while aligning the unit LCD panel 500 to a predetermined reference position with respect to directions along directions parallel to the first and second pairs of opposing sides of the unit LCD panel 500.

In the checking/aligning unit 340 discussed above with respect to FIGS. 5 and 6A to 6C, the length of each of first to fourth checking bars 401 to 404 is greater than or equal to the length of first and second pairs of opposing sides of the largest size LCD panel 400 to be fabricated using the apparatus shown in FIG. 3. Accordingly, the first and second checking bars 401 and 402 cannot be driven simultaneously with the third and fourth checking bars 403 and 404. However, in the checking/aligning unit 340 discussed above with respect to FIGS. 7 and 8A to 8B, the length of the fourth checking bar 504 may be less than or substantially equal to the length of a second side of the smallest unit LCD panel 500 to be fabricated using the apparatus shown in FIG. 3. Accordingly, the first and second checking bars 501 and 502 may be driven simultaneously with the third and fourth checking bars 503 and 504, thereby reducing the time required to check/align the unit LCD panel 500 compared to the time required to check/align the unit LCD panel 400.

Referring back to FIG. 3, the edges of the aligned unit LCD panel may be ground by the grinding unit 350. After being ground, the unit LCD panel may be removed from the grinding unit 350 by the unloading unit 360.

As discussed above, the principles of the present invention provide a cut section checking unit, for checking cut sections of unit LCD panels (i.e., LCD panels separated from attached first and second base substrates) and a grinding unit for grinding edges of the unit LCD panels. The cut section checking and grinding units may be integrated within a grinding device to minimize the number of loading and unloading units and procedures required to fabricate an LCD panel. By minimizing the number of loading and unloading units and procedures required, a simplified apparatus for fabricating LCD panels may be provided whereby the expense of obtaining, operating, and maintaining such an apparatus may be reduced. Further, the apparatus according to principles of the present invention may occupy a reduced amount of space, thereby enabling efficient use of available fabrication facilities (e.g., clean rooms, or the like). Lastly, by minimizing the number of loading and unloading units and procedures required, the time required to fabricate an LCD panel may be effectively reduced.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for fabricating liquid crystal display panels, comprising:

attaching first and second base substrates;

cutting the attached first and second base substrates to form separate unit liquid crystal display panels, wherein each unit liquid crystal display panel includes a first pair of opposing sides and a second pair of opposing sides;

simultaneously checking cut sections of the unit liquid crystal display panels and aligning the unit liquid crystal display panels to a predetermined reference position, wherein the checking and aligning includes:

loading unit liquid crystal display panels onto a table and operably proximate to first, second, third and fourth checking bars; and driving the first, second, third and fourth checking bars along directions parallel to the first and second pairs of opposing sides of the unit liquid crystal display panels to contact respective ones of the first and second pairs of opposing sides of the unit liquid crystal display panels;

grinding edges of the aligned unit liquid crystal display panels; and unloading the ground unit liquid crystal display panels.

2. The method of claim 1, wherein the checking and aligning includes:

driving the first and second checking bars to check cut sections of the first pair of opposing sides and to align the unit liquid crystal display panels to a predetermined reference position along a direction parallel to the second pair of opposing sides; and driving the third and fourth checking bars to check cut sections of the second pair of opposing sides and to align the unit liquid crystal display panels to a predetermined reference position along a direction parallel to the first pair of opposing sides.

3. The method of claim 1, wherein the checking and aligning includes simultaneously driving the first, second, third and fourth checking bars to check cut sections of the first and second pairs of opposing sides and to align the liquid crystal display panels to a predetermined reference position along directions parallel to the first and second pairs of opposing sides.

4. A method for fabricating liquid crystal display panels, comprising:

attaching first and second base substrates;

separating a plurality of unit liquid crystal display panels from within the attached first and second base substrates, the plurality of unit liquid crystal display panels having first and second pairs of opposing sides;

loading the unit liquid crystal display panels onto a table and between first, second, third and fourth checking bars;

driving the first, second, third and fourth checking bars to simultaneously check edges of the first and second pairs of opposing sides of the unit liquid crystal display panels and to align the unit liquid crystal display panels to a predetermined reference position, wherein the checking and aligning includes:

driving the first and second checking bars to check cut sections of the first pair of opposing sides and to align the unit liquid crystal display panels to a predetermined reference position along a direction parallel to the second pair of opposing sides; and driving the third and fourth checking bars to check cut sections of the second pair of opposing sides and to align the unit liquid crystal display panels to a predetermined reference position along a direction parallel to the first pair of opposing sides;

grinding edges of the aligned unit liquid crystal display panels; and unloading the ground unit liquid crystal display panels.

5. The method of claim 4, wherein the checking and aligning includes simultaneously driving the first, second, third and fourth checking bars to check cut sections of the first and second pairs of opposing sides and to align the liquid crystal display panels to a predetermined reference position along directions parallel to the first and second pairs of opposing sides.

* * * * *